US012142261B2

(12) United States Patent
Khadloya et al.

(10) Patent No.: US 12,142,261 B2
(45) Date of Patent: Nov. 12, 2024

(54) AUDIO TYPE DETECTION

(71) Applicant: INTELLIVISION TECHNOLOGIES CORP., San Jose, CA (US)

(72) Inventors: Krishna Khadloya, San Jose, CA (US); Chandan Gope, Cupertino, CA (US); Vaidhi Nathan, San Jose, CA (US)

(73) Assignee: Nice North America LLC, Carlsbad, CA (US)

( * ) Notice: Subject to any disclaimer, the term of this patent is extended or adjusted under 35 U.S.C. 154(b) by 81 days.

(21) Appl. No.: 17/203,269

(22) Filed: Mar. 16, 2021

(65) Prior Publication Data

US 2021/0210074 A1 Jul. 8, 2021

Related U.S. Application Data

(63) Continuation of application No. 16/280,806, filed on Feb. 20, 2019, now Pat. No. 10,978,050.

(Continued)

(51) Int. Cl.
*G10L 15/16* (2006.01)
*G06F 9/54* (2006.01)
(Continued)

(52) U.S. Cl.
CPC .............. *G10L 15/16* (2013.01); *G06F 9/542* (2013.01); *G06N 3/045* (2023.01); *G06N 3/08* (2013.01);
(Continued)

(58) Field of Classification Search
CPC ......... G10L 15/16; G10L 25/21; G10L 25/18; G06N 20/20; G06N 20/10; G06N 3/08; G06N 3/0454; G06F 9/542
See application file for complete search history.

(56) References Cited

U.S. PATENT DOCUMENTS 6,028,626 A 2/2000 Aviv
6,594,629 B1 7/2003 Basu et al.
(Continued)

FOREIGN PATENT DOCUMENTS

CN 104346607 A 11/2014
CN 106372576 A 2/2017
(Continued)

OTHER PUBLICATIONS

Colangelo, Federico, et al. "Enhancing audio surveillance with hierarchical recurrent neural networks." 2017 14th IEEE International Conference on Advanced Video and Signal Based Surveillance (AVSS). IEEE, 2017. (Year: 2017).*

(Continued)

*Primary Examiner* — Brian L Albertalli
(74) *Attorney, Agent, or Firm* — Fox Rothschild LLP

(57) ABSTRACT

Artificial intelligence-based processing can be used to classify audio information received from an audio input unit. In an example, audio information can be received from a microphone configured to monitor an environment. A processor circuit can identify identifying one or more features of the audio information received from the microphone and use a first applied machine learning algorithm to analyze the one or more features and determine whether the audio information includes an indication of an abnormal event in the environment. In an example, the processor circuit can use a different second applied machine learning algorithm, such as a neural network-based deep learning algorithm, to analyze the same one or more features and classify the audio information as including an indication of a particular event type in the environment.

15 Claims, 6 Drawing Sheets

Related U.S. Application Data

(60) Provisional application No. 62/632,421, filed on Feb. 20, 2018.

(51) Int. Cl.
```
G06N 3/045      (2023.01)
G06N 3/08       (2023.01)
G06N 20/10      (2019.01)
G06N 20/20      (2019.01)
G10L 25/18      (2013.01)
G10L 25/21      (2013.01)
```

(52) U.S. Cl.
CPC ............. *G06N 20/10* (2019.01); *G06N 20/20* (2019.01); *G10L 25/18* (2013.01); *G10L 25/21* (2013.01)

(56) References Cited

U.S. PATENT DOCUMENTS

| | | | |
|---|---|---|---|
| 6,681,032 | B2 | 1/2004 | Bortolussi et al. |
| 7,113,090 | B1 | 9/2006 | Saylor et al. |
| 7,847,820 | B2 | 12/2010 | Vallone et al. |
| 7,999,857 | B2 | 8/2011 | Bunn et al. |
| 8,139,098 | B2 | 3/2012 | Carter |
| 8,237,571 | B2 | 8/2012 | Wang et al. |
| 8,527,278 | B2 | 9/2013 | David |
| 8,660,249 | B2 | 2/2014 | Rondeau et al. |
| 9,105,053 | B2 | 8/2015 | Cao et al. |
| 9,135,797 | B2 | 9/2015 | Couper et al. |
| 9,208,675 | B2 | 12/2015 | Xu et al. |
| 9,224,044 | B1 | 12/2015 | Laska et al. |
| 9,230,560 | B2 | 1/2016 | Ehsani et al. |
| 9,304,736 | B1 | 4/2016 | Whiteley et al. |
| 9,313,312 | B2 | 4/2016 | Merrow et al. |
| 9,479,354 | B2 | 10/2016 | Yamanishi et al. |
| 9,740,940 | B2 | 8/2017 | Chattopadhyay et al. |
| 9,830,932 | B1* | 11/2017 | Gunderson .............. G08B 5/22 |
| 10,014,003 | B2 | 7/2018 | Kim et al. |
| 10,032,326 | B1 | 7/2018 | Landers, Jr. et al. |
| 10,073,428 | B2 | 9/2018 | Bruhn et al. |
| 10,469,283 | B1 | 11/2019 | Kinney et al. |
| 10,569,420 | B1 | 2/2020 | Cohen et al. |
| 10,834,365 | B2 | 11/2020 | Khadloya et al. |
| 2001/0047264 | A1 | 11/2001 | Roundtree |
| 2005/0267605 | A1 | 12/2005 | Lee et al. |
| 2006/0190419 | A1 | 8/2006 | Bunn et al. |
| 2012/0026328 | A1 | 2/2012 | Sethna et al. |
| 2012/0143363 | A1 | 6/2012 | Liu et al. |
| 2013/0237240 | A1 | 9/2013 | Krantz et al. |
| 2013/0275138 | A1 | 10/2013 | Gruber et al. |
| 2014/0046878 | A1 | 2/2014 | Lecomte et al. |
| 2014/0222436 | A1 | 8/2014 | Binder et al. |
| 2015/0221321 | A1 | 8/2015 | Christian |
| 2016/0364963 | A1 | 12/2016 | Matsuoka et al. |
| 2016/0378861 | A1 | 12/2016 | Eledath et al. |
| 2016/0379456 | A1* | 12/2016 | Nongpiur ........... G08B 13/1672 340/541 |
| 2017/0311053 | A1 | 10/2017 | Ganjam et al. |
| 2017/0329466 | A1 | 11/2017 | Krenkler et al. |
| 2018/0047230 | A1 | 2/2018 | Nye |
| 2018/0232902 | A1 | 8/2018 | Albadawi et al. |
| 2018/0261213 | A1* | 9/2018 | Arik ......................... G06N 3/08 |
| 2018/0342329 | A1 | 11/2018 | Rufo et al. |
| 2019/0028759 | A1 | 1/2019 | Yuan et al. |
| 2019/0043525 | A1 | 2/2019 | Huang et al. |
| 2019/0103005 | A1* | 4/2019 | Gilberton ............ G10L 21/0224 |
| 2019/0139565 | A1 | 5/2019 | Chang et al. |
| 2019/0246075 | A1 | 8/2019 | Khadloya et al. |
| 2019/0259378 | A1 | 8/2019 | Khadloya et al. |
| 2019/0362608 | A1* | 11/2019 | Horling ................... G06F 3/167 |
| 2019/0377325 | A1 | 12/2019 | Angola Abreu |
| 2021/0029330 | A1 | 1/2021 | Khadloya et al. |

FOREIGN PATENT DOCUMENTS

| | | |
|---|---|---|
| CN | 107609512 A | 1/2018 |
| CN | 108540762 A | 9/2018 |

OTHER PUBLICATIONS

Dennis, Jonathan, Huy Dat Tran, and Haizhou Li. "Spectrogram image feature for sound event classification in mismatched conditions." IEEE signal processing letters 18.2 (2010): 130-133. (Year: 2010).*

Deller, John R., John G. Proakis, and John H. L. Hansen. Discrete-Time Processing of Speech Signals. New York: Institute of Electrical and Electronics Engineers, 2015. (Year: 2015).*

"U.S. Appl. No. 17/061,193, Final Office Action mailed Jul. 2, 2021", 17 pages.

"U.S. Appl. No. 17/061,193, Response filed Aug. 27, 2021 to Final Office Action mailed Jul. 2, 2021", 13 pages.

"U.S. Appl. No. 17/061,193, Advisory Action mailed Sep. 22, 2021", 2 pages.

"U.S. Appl. No. 16/271,183, Non Final Office Action mailed Dec. 11, 2019", 18 pgs.

"U.S. Appl. No. 16/271,183, Notice of Allowance mailed Jun. 25, 2020", 6 pgs.

"U.S. Appl. No. 16/271,183, Response filed Mar. 10, 2020 to Non Final Office Action mailed Dec. 11, 2019", 15 pgs.

"U.S. Appl. No. 16/280,806, Non Final Office Action mailed May 13, 2020", 17 pgs.

"U.S. Appl. No. 16/280,806, Notice of Allowance mailed Dec. 10, 2020", 9 pgs.

"U.S. Appl. No. 16/280,806, Response filed Sep. 14, 2020 to Non Final Office Action mailed May 13, 2020", 18 pgs.

"U.S. Appl. No. 17/061,193, Non Final Office Action mailed Dec. 10, 2020", 14 pgs.

"U.S. Appl. No. 17/061,193, Response filed Mar. 10, 2021 to Non Final Office Action mailed Dec. 10, 2020", 14 pgs.

"Eyewatch", Eyewatch Website, URL: https://eye-watch.in/Login.action, (accessed Feb. 4, 2019), 11 pgs.

"Home Automation with Smart Speakers—Amazon Echo vs. Google Home vs. Apple HomePod", Citius Minds Blog, accessed Feb. 4, 2019, URL: https://www.citiusminds.com/blog/wp-content/uploads/2017/08/Home_Automation_Smart_Speakers.pdf, (Aug. 2017), 20 pgs.

"Home Invasion: Google, Amazon Patent Filings Reveal Digital Home Assistant Privacy Problems", Comsumer Watchdog Executive Summary, accessed Feb. 4, 2019, URL: https://www.consumerwatchdog.org/sites/default/files/2017-12/Digital%20Assistants%20and%20Privacy.pdf, (Dec. 2017), 15 pgs.

Clavel, Chloe, et al., "Events detection for an audio-based surveillance system", 2005 IEEE International Conference on Multimedia and Expo. IEEE, (2005), 4 pgs.

Huang, Hua, et al., "WiDet: Wi-Fi Based Device-Free Passive Person Detection with Deep Convolutional Neural Networks", Proc. of the 21st ACM Intl. Conference on Modeling, Analysis and Simulation of Wireless and Mobile Systems (MSWIM), (2018), 53-60.

Jacobson, Julie, "Patent: Vivint 'Door Knock' Tech Might Help Identify Guests by Unique Sound Signatures", CE Pro Magazine and Website, accessed Feb. 4, 2019, URL: https://www.cepro.com/article/patent_audio_analytics_ai_vivint_door_knock_identify_people_sound_signature, (Apr. 20, 2017), 7 pgs.

Jurrien, Ilse, "Samsung Bixby Smart Speaker met Camera en Display", LetsGo Digital, accessed Feb. 4, 2019, w/ English machine translation, URL: https://nl.letsgodigital.org/speakers-hifi/samsung-bixby-smart-speaker/, (Jun. 13, 2018), 12 pgs.

Metz, Rachel, et al., "Using Deep Learning to Make Video Surveillance Smarter", MIT Technology Review Online, [Online] Retrieved from the internet on Feb. 4, 2019: <URL: https://www.technologyreview.com/s/540396/using-deep-learning-to-make-video-surveillance-smarter/>, (Aug. 17, 2015), 3 pgs.

(56) References Cited

OTHER PUBLICATIONS

Ntalampiras, Stavros, et al., "An adaptive framework for acoustic monitoring of potential hazards", EURASIP Journal on Audio, Speech, and Music Processing Jan. 2009(2009): 594103, (2009), 15 pgs.

Rasti, Pejman, et al., "Convolutional Neural Network Super Resolution for Face Recognition in Surveillance Monitoring", Proc. of the Intl. Conference on Articulated Motion land Deformable Objects (AMDO), (Jul. 2, 2016), 175-184.

Shaw, C. Mitchell, "New Patents: Google Wants to Monitor Everything You and Your Children Do at Home", The New American, accessed Feb. 4, 2019, URL: https://www.thenewamerican.com/tech/computers/item/30733-new-patents-google-wants-to-monitor-everything-you-and-your-children-do-at-home, (Nov. 26, 2018), 9 pgs.

Whitney, Lance, "How to Call Someone From Your Amazon Echo", PC Magazine Online, accessed Feb. 4, 2019, URL: https://www.pcmag.com/feature/358674/how-to-call-someone-from-your-amazon-echo, (Dec. 25, 2018), 13 pgs.

U.S. Appl. No. 16/280,806, filed Feb. 20, 2019, Audio Type Detection.

U.S. Appl. No. 16/271,183 U.S. Pat. No. 10,834,365, filed Feb. 8, 2019, Audio-Visual Monitoring Using a Virtual Assistant.

U.S. Appl. No. 17/061,193, filed Oct. 1, 2020, Audio-Visual Monitoring Using a Virtual Assistant.

"U.S. Appl. No. 17/061,193, Non Final Office Action mailed Mar. 16, 2022", 13 pgs.

"U.S. Appl. No. 17/061,193, Response filed Jul. 18, 2022 to Non Final Office Action mailed Mar. 16, 2022", 14 pgs.

\* cited by examiner

AUDIO TYPE DETECTION

CLAIM OF PRIORITY

This patent application is a Continuation of U.S. patent application Ser. No. 16/280,806, entitled "Audio Type Detection", filed on Feb. 20, 2019, which claims the benefit of priority of U.S. Provisional Patent Application Ser. No. 62/632,421, entitled "System and Method for Audio Type Detection", filed on Feb. 20, 2018, which are incorporated by reference herein in their entirety.

BACKGROUND

An intelligent assistant device can include a software-implemented agent that can perform tasks or services for a user. The performed tasks can be based on a user input, device location awareness, and information from a variety of online sources, among other things. Intelligent assistant devices, sometimes referred to as "smart speakers", can be used in home or office environments. The devices include one or more microphones for receiving a voice-based or other audible input signal, and include one or more speakers for relaying information to a user. They can also include touch panels such as security system touch panels or control panels with microphones, speakers, and/or touch interfaces or can include a headless device. Use cases for such devices generally include responding to audio-based command, touch, or gestures, and/or display of video or other information. These devices and user input mechanisms are used to control other smart devices such as security sensors, lights, appliances, televisions and others.

In some examples, an assistant device can retrieve various information in response to a user inquiry, such as information about weather conditions, traffic, news, stock prices, user schedules, and retail prices, among other things. Some intelligent assistant devices perform concierge-type tasks such as making dinner reservations, purchasing event tickets, and making travel arrangements, and some can be configured to automatically perform various data management tasks based on online information and events, including without user initiation or interaction.

SUMMARY

The present inventors have recognized, among other things, that a problem to be solved can include augmenting one or more functions of an audio assistant device for safety, security, monitoring, or surveillance, and reducing false positive detections of adverse events or other events that can be deemed or understood to be of little or no significant interest. The present subject matter can help provide a solution to this problem, such as by using machine learning-based processing of audio information from a monitored environment to detect one or more events as indicated by the audio information. In an example, the solution can include using machine learning to process image and/or audio information to detect events in the environment.

Aspect 1 can include or use subject matter (such as an apparatus, a system, a device, a method, a means for performing acts, or a device readable medium including instructions that, when performed by the device, can cause the device to perform acts, or an article of manufacture), such as can include or use a method for using artificial intelligence-based processing to classify audio information received from an audio input unit. Aspect 1 can include receiving audio information from a microphone configured to monitor an environment and, using a processor circuit, identifying one or more features of the audio information received from the microphone, and using a first applied machine learning algorithm to analyze the one or more features, determining whether the audio information includes an indication of an abnormal event in the environment, and using a different second applied machine learning algorithm to analyze the same one or more features, classifying the audio information as including an indication of a particular event type in the environment. In an example, Aspect 1 can include generating an alert about the particular event type.

Aspect 2 can include or use, or can optionally be combined with the subject matter of Aspect 1, to optionally include classifying the audio information includes confirming or refuting the indication of an abnormal event in the environment.

Aspect 3 can include or use, or can optionally be combined with the subject matter of one or any combination of Aspects 1 or 2 to optionally include using the first applied machine learning algorithm includes using the processor circuit to use support vector machines or a neural network to determine whether the audio information includes the indication of the abnormal event.

Aspect 4 can include or use, or can optionally be combined with the subject matter of one or any combination of Aspects 1 through 3 to optionally include the first applied machine learning algorithm includes a neural network-based deep learning algorithm.

Aspect 5 can include or use, or can optionally be combined with the subject matter of one or any combination of Aspects 1 through 4 to optionally include using the first or different second applied machine learning algorithm includes using the processor circuit embedded in a smart speaker device.

Aspect 6 can include or use, or can optionally be combined with the subject matter of one or any combination of Aspects 1 through 5 to optionally include using the different second applied machine learning algorithm includes using the processor circuit to use a deep learning neural network-based algorithm to classify the audio information.

Aspect 7 can include or use, or can optionally be combined with the subject matter of one or any combination of Aspects 1 through 6 to optionally include classifying the audio information includes identifying whether the audio information includes an acoustic signature of one or more of breaking glass, a gun shot, a dog bark, a security alarm, a fire alarm, a smoke alarm, a water alarm, human voices, or human crying.

Aspect 8 can include or use, or can optionally be combined with the subject matter of one or any combination of Aspects 1 through 7 to optionally include determining a loudness characteristic of the received audio information and wherein the identifying the one or more features of the audio information is conditioned on the loudness characteristic exceeding a specified minimum loudness threshold.

Aspect 9 can include or use, or can optionally be combined with the subject matter of one or any combination of Aspects 1 through 8 to optionally include identifying the one or more features of the audio information includes determining a power spectrum or spectrogram, and wherein the determining whether the audio information includes the indication of the abnormal event includes using the power spectrum or spectrogram.

Aspect 10 can include or use, or can optionally be combined with the subject matter of one or any combination of Aspects 1 through 9 to optionally include segmenting the received audio information into overlapping frames, and wherein the identifying the one or more features of the audio information includes using at least a first one of the frames.

Aspect 11 can include or use, or can optionally be combined with the subject matter of one or any combination of Aspects 1 through 10 to optionally include generating the alert includes communicating an alert to a user who is associated with a smart speaker, wherein the smart speaker includes the microphone.

Aspect 12 can include or use, or can optionally be combined with the subject matter of one or any combination of Aspects 1 through 11 to optionally include providing training data for use by the first and/or different second applied machine learning algorithm. In an example, the training data can include hard negative target samples and/or can include positive target samples. The target samples, positive or negative, can be mixed with one or more background noise sources.

Aspect 13 can include, or can optionally be combined with the subject matter of one or any combination of Aspects 1 through 12 to include or use, subject matter (such as an apparatus, a method, a means for performing acts, or a machine readable medium including instructions that, when performed by the machine, that can cause the machine to perform acts), such as can include or use a system for performing automated audible event detection and classification. In an example, Aspect 13 can include an audio sensor configured to monitor an environment and a processor circuit configured to identify one or more features of the audio information received from the microphone and use a first applied machine learning algorithm to analyze the one or more features and determine whether the audio information includes an indication of an abnormal event in the environment. Aspect 13 can include the processor circuit further configured to use a different second applied machine learning algorithm to analyze the same one or more features and classify the audio information as including an indication of a particular event type in the environment. In an example, Aspect 13 can include the processor circuit further configured to communicate an alert about the particular event type to a user of the system.

Aspect 14 can include or use, or can optionally be combined with the subject matter of Aspect 13, to optionally include or use a memory circuit that includes a reference data set for use by the first or different second applied machine learning algorithms, wherein the reference data set includes positive target samples and hard negative target samples, and wherein at least a portion of the positive target samples are mixed with background noise information.

Aspect 15 can include or use, or can optionally be combined with the subject matter of one or any combination of Aspects 13 or 14 to optionally include the audio sensor and the processor circuit embedded in a smart speaker or camera device.

Aspect 16 can include or use, or can optionally be combined with the subject matter of one or any combination of Aspects 13 through 15 to optionally include the processor circuit configured to use the different second applied machine learning algorithm to classify the audio information as including an acoustic signature of one or more of breaking glass, a gun shot, a dog bark, a security alarm, a fire alarm, a smoke alarm, a water alarm, human voices, or human crying.

Aspect 17 can include or use, or can optionally be combined with the subject matter of one or any combination of Aspects 13 through 16 to optionally include a processor circuit configured to determine a loudness characteristic of the received audio information and wherein the processor is configured to identify the one or more features of the audio information only when the loudness characteristic exceeds a specified minimum loudness threshold.

Aspect 18 can include or use, or can optionally be combined with the subject matter of one or any combination of Aspects 13 through 17 to optionally include the processor circuit configured to identify a power spectrum or spectrogram of the audio information, and wherein the one or more features of the audio information includes the power spectrum or spectrogram.

Aspect 19 can include, or can optionally be combined with the subject matter of one or any combination of Aspects 1 through 18 to include or use, subject matter (such as an apparatus, a method, a means for performing acts, or a machine readable medium including instructions that, when performed by the machine, that can cause the machine to perform acts), such as can include or use a smart speaker for monitoring activities in an environment. In Aspect 19, the smart speaker can include an audio receiver circuit configured to receive acoustic information from a microphone in an environment and generate a series of overlapping audio sample frames representative of the acoustic information. In an example, Aspect 19 can include a processor circuit configured to identify a power spectrum of the acoustic information received from the microphone when the power spectrum indicates that the acoustic information includes an audible event and the audible event has greater than a specified threshold loudness characteristic and use a first applied machine learning algorithm to analyze the power spectrum of the acoustic information and determine whether the acoustic information includes an indication of an abnormal event in the environment. In an example, in Aspect 19, the processor circuit can be configured to use a neural network-based deep learning algorithm to analyze the same power spectrum of the acoustic information and classify the acoustic information as including an indication of a particular event type in the environment. In an example, in Aspect 19, the processor circuit can be configured to communicate an alert about the particular event type to a user of the system.

Aspect 20 can include or use, or can optionally be combined with the subject matter of Aspect 19, to optionally include the processor circuit configured to classify the acoustic information as including an acoustic signature of one or more of breaking glass, a gun shot, a dog bark, a security alarm, a fire alarm, a smoke alarm, a water alarm, human voices, or human crying, and can include the processor circuit configured to communicate to the user a portion of the acoustic information that corresponds to the acoustic signature.

Each of these non-limiting Aspects or examples can stand on its own, or can be combined in various permutations or combinations with one or more of the other examples.

This Summary is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

DETAILED DESCRIPTION

Figure 1:
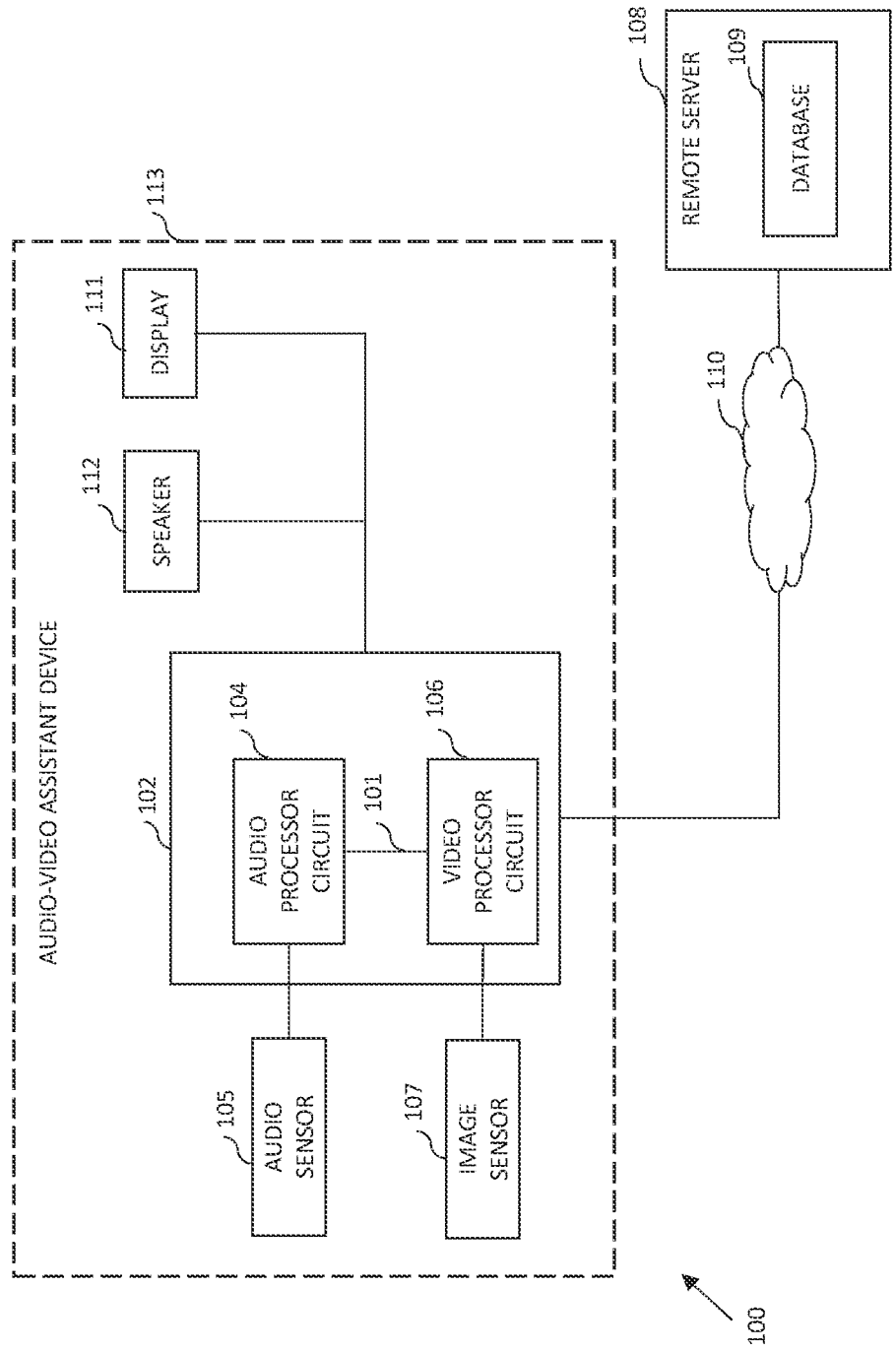
FIG. 1 illustrates generally an example of a system that includes an audio-video assistant device.

In an example, an audio assistant device can provide a secure and personalized user experience and can enhance productivity and communication. In an example, an image sensor can be added to an existing or legacy audio-only, microphone-based office assistants or smart speaker to enable additional functions and use cases.

In an example, an audio-video assistant device can include one or more microphones, one or more cameras or image sensors, and one or more processor circuits. The device can receive and process audio and video or image input data about an environment such as to identify or extract information about objects and people to determine what or who is present in the environment. In an example, the input information can be further processed to identify specific individuals by name or type and one or more responsive actions can be initiated. The combined audio and visual information can enable better system understanding of who can be speaking or providing commands to the assistant device, and in some cases can be used to eliminate a requirement for a specific wakeword or hotword, that is, an action word or trigger word from the user that is recognized by a device as a signal to begin monitoring.

In an example, an audio assistant or an audio-video assistant device provides an enhanced security and lifestyle monitoring system. In an example, audio signal monitoring or audio type detection using the systems and methods discussed herein can comprise a portion of or can be integrated with a home or commercial security system or security control panel. In an example, a security system or control panel can include or use a camera, microphone, speaker, display, or other interface. In an example, a security system can include one or more sensors configured for particular uses, such as contact sensors for windows or doors, motion sensors for sensing human or animal presence or movement in an environment, or other security sensors. Information from an audio type detector as discussed herein, such as comprising the system 100, can be used with security system sensor information to provide authentication or verification of potential security threats or breaches. For example, a glass break even detected using a window sensor can be confirmed or authenticated using acoustic information analyzed using the audio type detector.

For example, in a security mode, the device can use its audio receiver and processor to identify audio signatures of any abnormal sounds such as breaking glass, a gun shot, a dog bark, a security alarm, a fire alarm, a smoke alarm, a water alarm, loud voices, crying, or yelling, or any other unusual noise in home, building, or other environment. An audio signature can include, for example, amplitude or frequency information corresponding to a particular event or activity. In an example, the device can use its audio receiver and processor to identify human speech or a conversation when the environment is otherwise expected to be vacant. In an example, the device can use artificial intelligence to discern normal from abnormal noises, objects, or activities in a monitored environment and, when such an abnormal noise, object, or activity is identified, then the device can initiate an alert or alarm.

In an example, a processor circuit can receive information from an audio sensor and continuously process audio from the sensor such as substantially in real-time. The processor circuit can analyze the audio to determine where an audio source is located in an environment, such as using a motion detection algorithm. In an example, the processor circuit can detect and analyze human speech and can be configured to detect one or more known or unknown individuals in the environment or scene based on speech patterns, frequency content, or other information, In an example, an assistant device can be configured to automatically or manually enter an environment monitoring mode. For example, a user, such as an individual who is authenticated by the device, can use a command or trigger word such as "Start Monitoring Mode" to place the device in an environment monitoring mode. The device will then begin an appropriate video and/or audio monitoring algorithm, or set of algorithms, provided the user was authorized to initiate such an activity. In an example, the environment monitoring mode can start automatically when the user enters or exits a scene or environment, or according to a predefined schedule. Various monitoring rules can be provided to define a type and method of alerting an end user or system owner. For example, a push notification can be provided to a user's mobile device, and rules governing such notification processing can be stored either in a remote, cloud-based computing environment or can be entered by a user during an initial setup or configuration phase.

In an example, an assistant device according to the present disclosure can use processor-implemented artificial intelligence to analyze or respond to information from the audio sensor, from the image sensor, or from a combination of audio, video, and/or other monitoring sensors such as thermostat or other environment condition sensors, door sensors, window sensors, lock sensors, etc. The processor-implemented artificial intelligence, as used herein, generally includes one or both of machine learning and deep learning. In some instances, one or the other of machine learning and deep learning can be used or implemented to achieve a particular result. Accordingly references herein to one or the other of machine learning and deep learning can be understood to encompass one or both forms of artificial intelligence processing.

Classical or traditional machine learning (sometimes referred to herein as "ML" or "classical ML") can include or use algorithms such as Bayes Decision, Regression, Decision Trees/Forests, Support Vector Machines, or Neural Networks, among others. Deep learning (sometimes referred to herein as "DL") can be based on deep neural networks and can use multiple layers, such as convolution layers. Such DL, such as using layered networks, can be efficient in their implementation and can provide enhanced accuracy relative to classical ML techniques. In practice, DL algorithms can be more computationally demanding than classical ML algorithms.

In an example, classical machine learning (ML) can be distinguished from deep learning (DL). Generally, DL models can outperform classical ML models. However, DL models can consume a relatively larger amount of processing or power resources, and such resources can be scarce on embedded platforms such as platforms without dedicated graphics processing cores.

In an example, an audio classification technique can include or use a two-stage approach. In a first stage, a classical ML model can be used, such as a Support Vector Machines (SVM) model or technique. Other models such as Logistic Regression, Decision Trees, Neural networks, or others can be used. In a second stage, a DL model can be based on a Convolutional Neural Network (CNN), for example, using a 48×96 spectrogram. The DL model can be optimized to balance the competing requirements of accuracy and edge processing on embedded devices that can be power limited. In an example, devices that include an embedded co-processor such as a DSP or GPU can execute classification techniques using more complicated models.

In an example, the audio classification technique can include using a loudness detector to optimize computation time and processing resource usage. For example, the loudness detector can be used to identify sounds that have greater than a specified threshold loudness characteristic such that only sufficiently loud sounds are further processed. When a sufficiently loud sound is detected, then subsequent steps of feature extraction and machine learning and/or deep learning-based classifications can be performed.

FIG. 1 illustrates generally an example of a system 100 that includes an audio-video assistant device 113. The system 100 includes a first processor circuit 102 that can include one or more processing cores, and each core can have a respective different function. In an example, the first processor circuit 102 is a notional circuit that includes multiple different discrete processor circuits or cores that are coupled by an interface 101. In the example of FIG. 1, the first processor circuit 102 includes an audio processor circuit 104 and a video processor circuit 106. The system 100 includes an audio sensor 105 such as a microphone that can receive audio signals and provide audio signal information to the audio processor circuit 104. The system 100 includes an image sensor 107 such as a camera that can receive image signals and provide image information to the video processor circuit 106. Although the present discussion includes or refers to the audio-video assistant device 113, it can be understood that an audio-only assistant device, or other audio-only monitoring or security device, can be provided with the same or similar hardware and/or software and can exclude the image sensor 107 and/or the video processor circuit 106.

In an example, the audio processor circuit 104 can be a dedicated hardware unit configured to process audio, while in other examples, the audio processor circuit 104 can be a software-implemented module that is executed on the same or different processor circuit.

In an example, the audio sensor 105 includes one or more microphones, such as an array of microphones, configured to receive one or more audio input signals such as from a user or from various non-user-based occurrences in an environment. In an example, one or more signals from the audio sensor 105 can be processed for noise reduction, feedback elimination, beam forming and automatic gain control.

In an example, the image sensor 107 includes a sensor with a particular field of view (FOV). In an example, the image sensor 107 includes two 180 degree view sensors, such as can be vertically joined back-to-back to provide a 360 degree view of the environment. In another example, the image sensor 107 includes a camera providing a 180 degree view in a horizontal direction. Such a single camera can be configured to rotate or look in a circular manner around the environment, and an image generated by such camera can be warped and de-warped for analysis or display purposes.

The first processor circuit 102 can be communicatively coupled to a remote server 108 using a network 110, The network 110 can be any suitable wired network, wireless network, or a combination of wired, wireless, or other network. In an example, the network 110 includes a LAN or wireless LAN connection, an internet connection, a point-to-point connection, or other network connection and combinations thereof. The network 110 can be any other type of network that is configured to transmit or receive data from host computers, personal devices, telephones, or any other electronic devices. The network 110 can be a combination of an enterprise network (or the Internet) and a cellular network, in which case, suitable systems and methods are employed to seamlessly communicate between the networks, and a mobile switching gateway can be used to communicate with a computer network gateway to pass data between the networks. The network 110 can include or use any software, hardware, or computer applications that can provide a medium to exchange signals or data in various formats.

The system 100 can include a display 111 for displaying information generated by the first processor circuit 102, and a speaker 112 for providing audible information generated by the first processor circuit 102, such as including audible responses to user inquiries. In an example, the display 111 and the speaker 112 can be part of a computing device, such as a personal computer, a laptop, a smart phone, and the like.

In an example, the audio sensor 105, the audio processor circuit 104, and optionally the speaker 112, can be integrated in a single device, sometimes referred to as an audio assistant, an intelligent audio assistant device, a voice-controlled virtual assistant (VCVA), or a user-controlled virtual assistant (UCVA). In an example, the image sensor 107, the video processor circuit 106, and optionally the display 111, can be integrated together in a single device, sometimes referred to as a video assistant or an intelligent video assistant device. In an example, the intelligent video assistant device can be communicatively coupled to an intelligent audio assistant device using an interface such as the interface 101 that couples the processor circuits. In the example illustrated in FIG. 1, the central processor circuit 102, the audio sensor 105, the image sensor 107, the display 111, and the speaker 112 can be integrated together to form a device referred to herein as an intelligent audio-video assistant device 113.

Artificial intelligence-based analysis of information from the audio sensor 105 can be performed locally in the audio-video assistant device 113 by the audio processor circuit 104 or can be performed elsewhere, such as using the remote server 108. In an example, the audio processor circuit 104 and/or the remote server 108 can include or access a database 109 configured to store, among other things, object template data, audio signature data, and other information. In an office environment, the database 109 can store information about one or more employees, including names, roles, permitted or expected in/out times, designations, accessible systems, contact lists, calendars, etc. In an example, valid and recognizable users of a system can be predefined or enrolled or identified by the audio-video assistant device 113 and saved in the database 109. The database 109 can also be in communication with office enterprise servers to access office data of one or more users.

In an example, the audio processor circuit 104 can process audio information from one or more users, either locally or using the remote server 108. Thereafter, the first processor circuit 102 and/or the remote server 108 can use the audio information to decipher user requests and actions, and automatically service one or more user requests.

In an example, the first processor circuit 102 can perform a voice recognition algorithm on audio signals received from the audio sensor 105. Voice recognition can include identifying a person from a characteristic of his or her voice. Voice recognition can be used to determine who is speaking and/or to determine what is being said. Identification of a person who is speaking can be referred to as "speaker recognition" and identification of what is being said can be referred to as "speech recognition". In an example, recognizing a speaking individual can simplify the task of translating speech in systems that have been trained on a specific individual's voice, or it can be used to authenticate or verify a speaker's identity. Speaker verification seeks to determine a 1:1 match where one speaker's voice is matched to one template whereas speaker identification seeks to determine a match from among N voice templates. In an example, a recognition system can include two phases: enrollment and verification. During enrollment, an individual's voice is recorded and voice features (e.g., frequency components) are extracted to form a voice print, template, or model. In the verification phase, a speech sample or "utterance" is compared against a previously created voice print. For identification systems, the utterance is compared against multiple voice prints to determine a best match, while verification systems compare an utterance against a single voice print.

In an example, the audio processor circuit 104 can authenticate a user and can check for permission to put the device in one or more different modes, such as including a monitoring mode. In the monitoring mode, the system 100 can use information from the image sensor 107 and/or the audio sensor 105 to detect objects in the environment, capture motion information about the detected objects, track and classify objects in the environment, and detect and recognize sounds. In response, the first processor circuit 102 can use a rules-based framework to determine whether to sound an alarm or alert a particular system operator or user. In an example, the rules-based framework includes using a combination of data from one or more auxiliary sensors that are configured to transmit information to the system 100.

Figure 2:
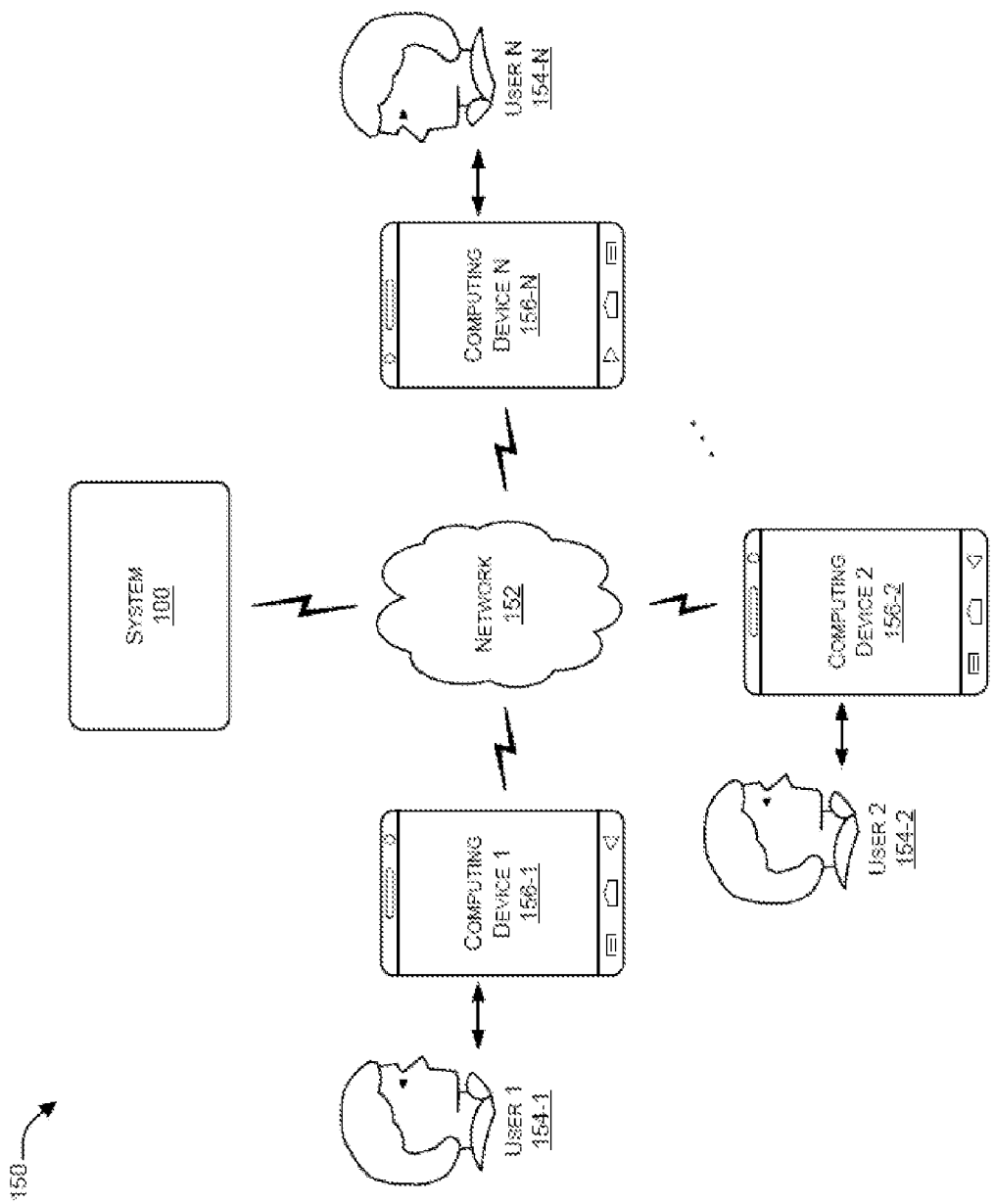
FIG. 2 illustrates generally an example of the system of FIG. 1 in communication with various computing devices

FIG. 2 illustrates generally an example of the system 100 in communication with various computing devices 156-1, 156-2, ..., 156-N (collectively referred to herein as computing devices 156 and individually referred to as computing device 156 hereinafter), such as using a second network 152. The system 100 can be implemented using any or a combination of hardware components and software components, such as those discussed above in the discussion of FIG. 1, or can be implemented using another security device, computing system and the like, such that embodiments of the present disclosure can be used for monitoring or surveillance purposes.

In an example, the system 100 can interact with users 154-1, 154-2, ..., 154-N (collectively referred to herein as users 154 and individually referred to as user 154 hereinafter), through the computing devices 156 or through applications residing on the computing devices 156. In an example, the system 100 can be accessed by applications residing on any operating system, including but not limited to Android, iOS, and the like. Examples of the computing devices 156 can include, but are not limited to, a portable computer, a personal digital assistant, a handheld device, a smart phone, and a workstation. In an example, the computing devices 156 are mobile phones of the respective users 156. Further, the computing devices 156 can be any or a combination of a hardware or a software implementation that can perform monitoring and surveillance of a place or a zone such as personal computers of users, applications residing on computing devices, computing devices of public authorities or enterprises, and the like. Similarly, users 154 can also be individuals, organizations, government bodies, etc., such as can use monitoring and surveillance capabilities.

The second network 152, which can comprise a portion of the network 110 from the example of FIG. 1, can include a wireless network, a wired network or a combination thereof that can be implemented as one of the different types of networks, such as the Intranet, a Local Area Network (LAN), a Wide Area Network (WAN), and the like. The second network 152 can be a dedicated network or a shared network. In an example, a shared network can represent an association of the different types of networks that can use variety of protocols, for example, Hypertext Transfer Protocol (HTTP), Transmission Control Protocol/Internet Protocol (TCP/IP), Wireless Application Protocol (WAP), and the like. In an example, alerts or notifications generated by the system 100 can be communicated to the computing devices 156 of the users 154 using the second network 152.

In an example, an audio assistant (or smart speaker) or other office computer device including, e.g., a microphone or speaker, can process audio commands and determine user actions and requirements along with other types of inputs. Sometimes, an audio assistant operates without video or visual understanding or processing. Such an assistant device may not visually understand a scene or room or a name of an individual issuing a command, but such a device can be configured to use context clues or other information to learn about its environment and/or about one or more users interacting with the device.

Figure 3:
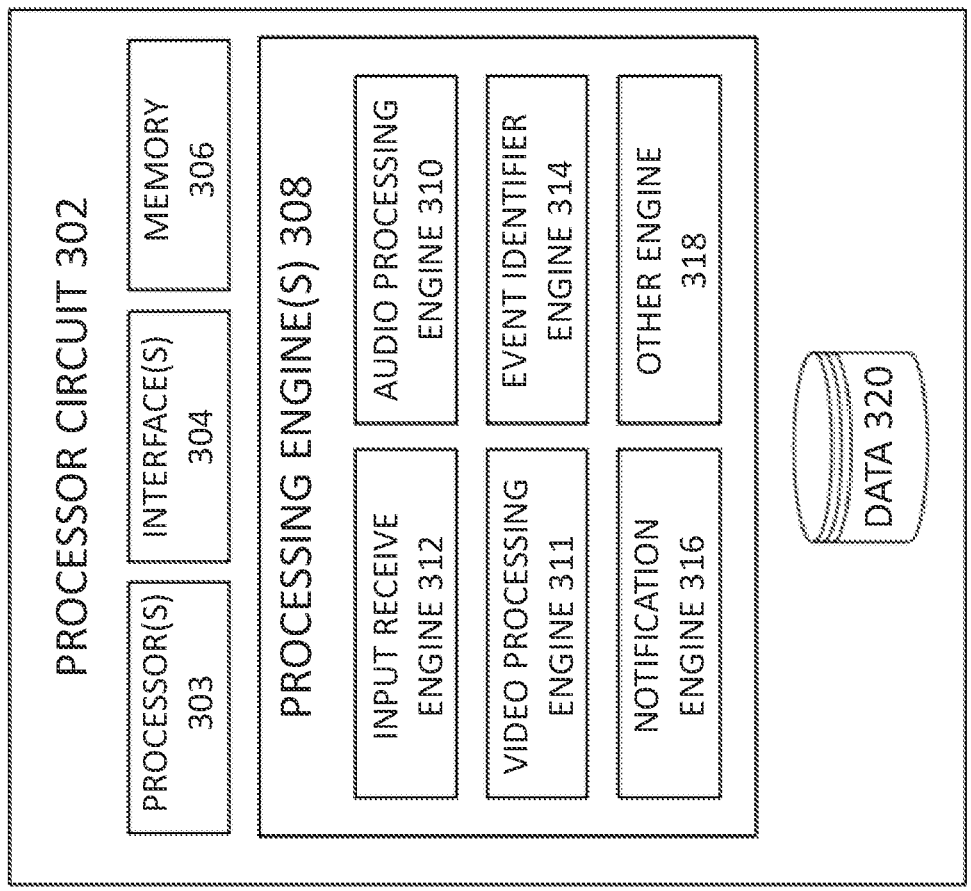
FIG. 3 illustrates generally an example of a processor circuit.

FIG. 3 illustrates generally an example of a processor circuit 302 that can comprise all or a portion of one or more of the other processor circuits discussed herein, such as the first processor circuit 102, the audio processor circuit 104, the video processor circuit 106, or one or more other processors or circuits. In an example, the processor circuit 302 can include one or more processor(s) 303 or processor cores. The one or more processor(s) 303 can be implemented as one or more microprocessor circuits, microcomputers, microcontrollers, digital signal processor circuits, central processor circuits, logic circuitries, and/or any devices that manipulate data based on operational instructions. Among other capabilities, the one or more processor(s) 303 are configured to fetch and execute computer-readable instructions stored in a memory 306. The memory 306 can store one or more computer-readable instructions or routines, which can be fetched and executed to create or share the data units over a network service. The memory 306 can comprise any non-transitory storage device including, for example, volatile memory such as RAM, or nonvolatile memory such as EPROM, flash memory, and the like.

The processor circuit 302 can comprise an interface(s) 304. The interface(s) 304 can comprise a variety of interfaces, for example, interfaces for data input and output devices, referred to as I/O devices, storage devices, and the like. The interface(s) 304 can facilitate communication of the processor circuit 302 with various devices coupled to the processor circuit 302 such as an input device and an output device. The interface(s) 304 can also provide a communication pathway for one or more components of the processor circuit 302. Examples of such components include, but are not limited to, various other processing circuits or engine(s) 308 and data 320.

The processing engine(s) 308 can be implemented as a combination of hardware and programming (for example, programmable instructions) to implement one or more functionalities of the processing engine(s) 308. In examples described herein, such combinations of hardware and programming can be implemented in different ways. For example, the programming for the processing engine(s) 308 can be processor executable instructions stored on a non-transitory machine-readable storage medium and the hardware for the processing engine(s) 308 can comprise a processing resource (for example, one or more processor circuits), to execute such instructions. In some examples, the machine-readable storage medium can store instructions that, when executed by the processing resource, implement the processing engine(s) 308. In such examples, the processor circuit 302 can comprise the machine-readable storage medium storing the instructions and the processing resource to execute the instructions, or the machine-readable storage medium can be separate but accessible to processor circuit 302 and the processing resource. In other examples, the processing engine(s) 308 can be implemented by other electronic circuitry.

The data 320 can comprise data that is stored or generated as a result of functions implemented by any of the components of the processing engine(s) 308. In an example, the processing engine(s) 308 can comprise an input receive engine 312, an audio processing engine 310 (e.g., comprising the audio processor circuit 104), a video processing engine 311 (e.g., comprising the video processor circuit 106), an event identifier engine 314, a notification engine 316, and other engines 318.

In an example, the input receive engine 312 receives input data from an input device, such as from the audio sensor 105 and/or from the image sensor 107. The input data can include, among other things, a sequence of images of a video stream and audio signals, such as audio signals that can be associated with video input data, such as for purposes of monitoring and surveillance. In an example, the audio processing engine 310 and the video processing engine 311 can process the audio signals and the video stream respectively. In an example, the video processing engine 311 can extract feature data from the input data to detect one or more objects in the respective images of the video stream.

In an example, the audio processing engine 310 can process audio commands received or detected by the audio sensor 105. In an example, the audio commands are selected to cause the system 100 to operate in an assistant mode or a monitoring mode. In an assistant mode, the system 100 can be configured to perform tasks or services for a user such as by using natural language processing (NLP) to match a user voice input to executable commands and can provide an audible response to the user through an output device such as the speaker 112, or provide some other system response. The audio processing engine 310 can continually learn using artificial intelligence techniques including machine learning and deep learning.

In a monitoring mode, the system 100 can perform tasks such as environment monitoring or surveillance. In an example, changing the operating mode of the system 100 can be performed when a designated or authenticated user provides instructions to change the mode. In an example, user authentication can include a combination of voice recognition by the audio processing engine 310 and face recognition by the video processing engine 311. In an example, the system 100 can automatically configure itself to operate in a monitoring mode based on detection of the one or more objects. For example, if a designated user is not detected by the system 100 for a preconfigured duration of time, or during a specified interval, then the system 100 can automatically enter the monitoring mode. That is, when the designated user is away, the system 100 can set itself to operate in the monitoring mode. In an example, a user can schedule the system 100 to operate in the monitoring mode for a fixed time during a day. For example, the system 100 can be placed into the monitoring mode during specified away-times, such as 9:00 a.m. to 5:00 p.m. to coincide with a workday.

In an example, the event identifier engine 314 can be used to determine an event by comparing attributes of one or more detected objects or audio events with pre-defined rules, such that when an event is determined a notification can be sent to the user using the notification communication engine 316. For example, a rule can be defined for a particular object that if the particular object is not detected in an image, then the particular object can be termed as a "missing object" and a notification can be sent to a user using the notification engine 316. In an example, the audio processing engine 310, the video processing engine 311, and the event identifier engine 314 can be used together to determine, e.g., missing objects, intrusion by an unidentified person, or other events that can trigger a notification to a user.

In an example, the notification engine 316 can be configured to notify various users based on a set of rules defined for each respective user. For example, if the system 100 is used by three users, user A, user B and user C, separate rules can be defined for each user so that the notifications can be sent to designated ones of the users only.

In an example, the system 100 can notify a user about detected unusual or abnormal visual events. For example, the system 100 can detect an intrusion into a designated zone or can determine if an individual is loitering or remaining in a particular zone for greater than a specified threshold time duration. In an example, the system 100 is configured to determine names or other information about detected individuals, if the system 100 is pre-configured with such information, and/or to label individuals or objects as unknown. In an example, the system 100 can detect and notify a user about regular events, for example, the system 100 can alert a user when a package or box or ecommerce delivery or mail is detected in a particular location in a field of view. In an example, system 100 can be used to notify a user about movements or activities of a pet.

In an example, the system 100 can detect and classify objects and provide appropriate notifications to a user. For example, an alert such as "Human-generated sounds detected" can be sent to a computing device of the user. In an example, the system 100 can send an alerts with corresponding video and/or sound information captured by the audio sensor 105 and/or the image sensor 107. In an example, the system 100 can have an Application Programming Interface (API) that can be used to push alerts so that a user monitoring the home, office, or any other defined pace or zone can remotely monitor and can notify appropriate authorities in an emergency situation. The system 100 can maintain a log by storing these alerts or notifications and associated video clips and sounds so that they can be reviewed later.

Figure 4:
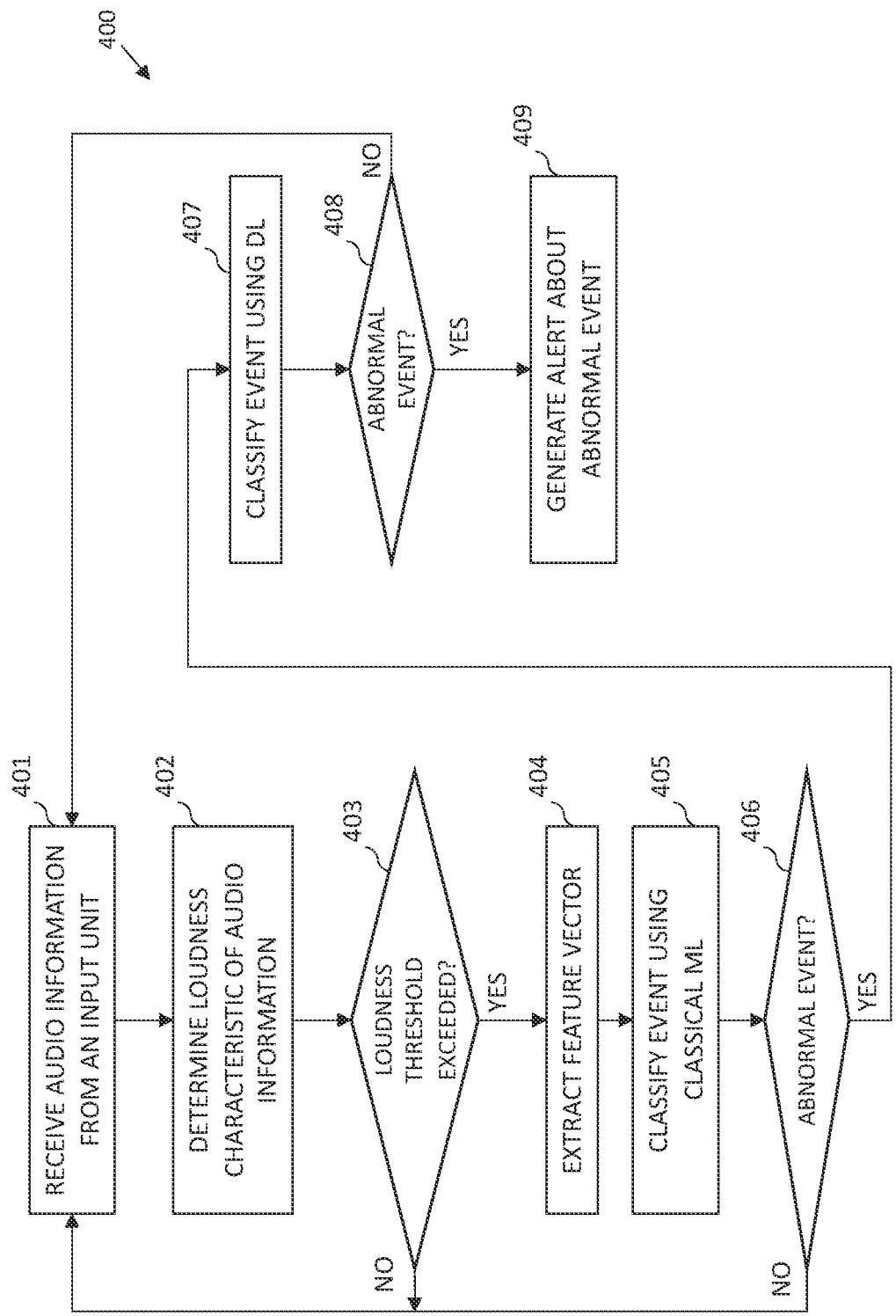
FIG. 4 illustrates generally an example that can include determining whether audio information includes an indication of an abnormal event.

FIG. 4 illustrates generally an example 400 that can include determining whether audio information includes an indication of an abnormal event. The example 400 can be performed in whole or in part using the system 100, such as using the audio sensor 105 to receive acoustic information from an environment. At step 401, the example 400 can include receiving audio information from an input unit, such as from the audio sensor 105. In an example, the audio information can include acoustic information including one or more of breaking glass, a gun shot, a dog bark, a security alarm, a fire alarm, a smoke alarm, a water alarm, loud voices, crying, or yelling, or any other unusual or abnormal noise in a home, building, or other environment. Generally, the audio information can include acoustic information in a range of human hearing (e.g., from about 20 Hz to 20 kHz), and in some examples, the audio information can include sound pressure information from outside of the range of human hearing.

At step 402, the example 400 can include determining a loudness characteristic of the audio information received at step 401. In an example, the audio processor circuit 104 or the first processor circuit 102 is configured to determine the loudness of the audio information, Loudness can be measured using an RMS (root mean square) technique or other technique. In an example, to enhance processing efficiency such as for embedded devices, the square root operation may not be computed. In such an example, downstream processing of the RMS result, such as a comparison of an RMS value with a threshold, can include adjusting the threshold.

At step 403, the example 400 can include determining whether the loudness characteristic determined at step 402 exceeds a specified loudness threshold. In an example, the audio processor circuit 104 or the first processor circuit 102 is configured to perform the threshold comparison. The loudness threshold comparison at step 403 can help reduce false positive alerts. Additionally, subsequent steps that can include feature extraction and/or ML or DL based classification can be performed more efficiently for example because the audio information can have a high signal to noise ratio.

At step 404, the example 400 can include extracting feature vector information from the same audio information received at step 401 or from other audio information. For example, the other audio information can include information received from the same audio sensor 105 or another audio sensor, such as including information from the same time interval or from a time-adjacent interval. In an example that includes a machine learning-based audio type classification, the same feature vector can be used as an input, thereby enhancing efficiency in a multiple stage machine learning classifier. An example that includes feature vector extraction or computation is provided in FIG. 5.

At step 405, the method 400 can include classifying the audio information using the system 100 to apply classical machine learning using the feature information determined at step 404. In an example, a classical ML-based classifier can include or use a linear Support Vector Machine (SVM), Logistic Regression, Decision Trees, neural networks, or other classifier. In an example, step 405 can include determining a likelihood that the audio information received at step 401 includes information about an abnormal event. At step 406, the example 400 can include determining whether the audio information classified at step 405 indicates that the audio information includes audible information about an abnormal event. For example, if a result of step 405 is an indication that the audio information is likely to include information about an abnormal event, then the method 500 can continue to step 407 with a different second classifier to determine more information about or to validate the abnormal event. If, however, the result of step 405 is an indication that the audio information not sufficiently likely to include information about an abnormal event, then the method 500 can return to step 401 to gather subsequent audio information for additional or substantially continuous analysis of the environment.

At step 407, the method 400 can include classifying the audio information using the system 100 to apply a deep learning-based classifier. In an example, step 407 can include or use a DL model that is based on a Convolutional Neural Network (CNN), for example, using a 48×96 spectrogram (see the example of FIG. 5). The DL model can be optimized to balance the competing requirements of accuracy and edge processing on a particular embedded device.

At step 408, the method 400 can include using the system 100 to determine whether the audio information classified at step 407 indicates that the audio information includes audible information about an abnormal event. For example, if a result of step 408 is an indication that the audio information is likely to include information about an abnormal event, then the method 500 can continue to step 409. If, however, the result of step 408 is an indication that the audio information not sufficiently likely to include information about an abnormal event, then the method 500 can return to step 401 to gather subsequent audio information for additional or substantially continuous analysis of the environment.

At step 409, the method 400 can include generating an alert about the abnormal event as identified at step 408. In an example, information about the abnormal event can be communicated or transmitted to a user or controller of the system 100, such as optionally including one or more of the users 154.

Figure 5:
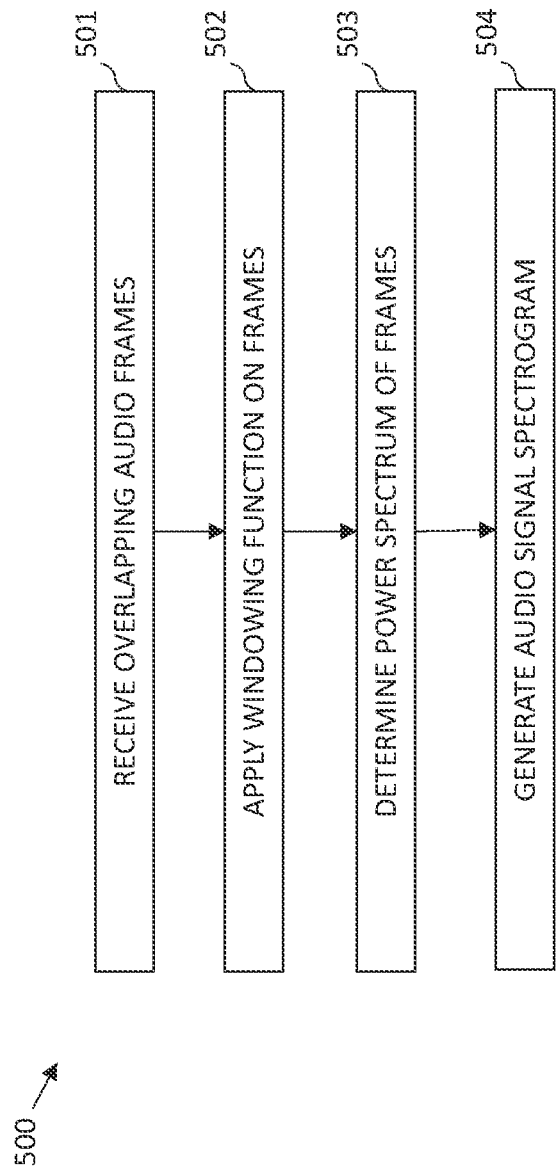
FIG. 5 illustrates generally an example of a method that can include generating an audio signal spectrogram.

FIG. 5 illustrates generally an example of a method 500 that can include generating an audio signal spectrogram. In an example, at step 501, the method 500 can include receiving overlapping audio frames. For example, audio information from the audio sensor 105 can be sampled, such as using the first processor circuit 102, and the sampled information can be segmented into frames. In an example, the frames can be sequential or time-adjacent, or the frames can be overlapping.

At step 502, the method 500 can include applying a windowing function on the audio frames received at step 501. In an example, the windowing function includes a Hamming windowing function or a Hann windowing function. The windowing function can be performed using the audio processor circuit 104 or another processor circuit.

In an example, a windowing function can be configured to pass frequency and amplitude information from the audio frames that is most likely to include an abnormal event of interest. For example, if the system 100 is configured to detect a glass break event then the windowing function can be configured to pass primarily middle and high frequency audio information. However, in an example, using ML-based processing can be configured to automatically learn about frequency or other content of interest and accordingly an ML-based technique can reduce or eliminate a need for frequency-based windowing.

At step 503, the method 500 can include determining a power spectrum of one or more of the audio frames received at step 501. Step 503 can be performed using the audio processor circuit 104 or another processor circuit. In an example, step 503 can include determining a power spectrum of information from one of the audio frames from step 502, such as following the windowing function processing of the audio frames. In an example, the power spectrum can be determined at step 503 using a fast Fourier transform (EFT) or other signal transform techniques that can provide information about a distribution, such as a relative or absolute distribution, of sound energy at or centered at different frequencies.

At step 504, the method 500 can include generating an audio signal spectrogram based on the power spectrum determined at step 503. In an example, the spectrogram generated at step 504 can include a representation of a spectrum or number of different frequencies or frequency bins that include information from the audio frames. The spectrogram information can be used as an input to one or more ML or DL classifiers.

In an example, a problem to be solved includes providing a highly accurate event classifier while limiting a processing limit imposed on edge devices, such as audio assistant devices, cameras, or other devices that can be configured to operate at the "edge" of a cloud or network-based computing environment. In an example, a solution to the problem can include curating training data that can be used by edge device-based classifiers.

In an example, training data can be bootstrapped with hard negatives. Bootstrapping with hard negatives can include iteratively growing a relatively small set of negative training data examples by selecting negatives for which the model or classifier provides a false alarm. For example, sampling negative samples randomly for model training can be relatively inefficient or inaccurate, leading to high rates of false alarms, instead, a training data set can be bootstrapped with consideration given to one or more particular or relevant sound event classification problems. For example, for glass break detection, common sources of false alarms can include, among other things, kitchen sounds, keys dropping, garage door openers, and others. Hence negative sample collection for training data can be focused on these and other scenarios. Then, ML or DL models can be built in bootstrapped stages. As a result, the models can be trained more rapidly, such as using less data, and can offer more efficient execution relative to other previous models.

In an example, curating training data can further include training data augmentation using realistic interference. For example, to achieve a low false negative rate, some solutions include or use signal source separation or noise reduction, for example to facilitate sound identification when multiple sounds a present or when the target sound is acquired in a noisy environment. In an example, a solution can include using multiple microphones and audio signal pre-processing algorithms for noise reduction or source separation. Such additional processing can add computational complexity and thus contribute to an increase in overall time and processing load. In an example, a solution can include omitting such pre-processing and instead delegating such "noise" management to an ML or DL analysis step. In an example, the training data can be collected in the presence of a variety of different but relevant background categories such as TV sounds, music, conversations, pet sounds, highway sounds, and other sounds that can contribute to noise in an environment. Following acquisition of such training data, positive samples of training data can be augmented, such as by mixing the various background sources with a target or sound of interest, such as glass-break. That is, a positive target sample such as a recording of a glass-break can be mixed with a different second recording of a particular kind of background noise and the mixed signal can be used as training data. The background noise can be frequency or amplitude adjusted to provide a large training data set, or the background noise can be tailored to a particular monitored environment. For example, if a monitoring device is placed in a public area near a highway, then the training data can include target data mixed with a variety of noises associated with a highway.

In an example, mixing one or more background sources with a target can be performed in software. Accordingly, a number of different training samples is virtually unlimited yet each of the samples can be relevant and can reflect a real-world scenario. One or more models trained using the training data can be applied in various ML or DL networks to enhance the network-based classifiers, such as without using a pre-processing stage. Further, the present technique can enable the present classifier systems to generate a large number of realistic positive samples spanning different background environments without having to actually capture the data in such environments.

Various use cases can include or use the system 100, the example 400 of FIG. 4, and/or the example 500 of FIG. 5, to perform audio type detection or classification and, optionally, notify a user or generate an alert based on the result. Some non-limiting use cases can include (1) recognizing a fire alarm, smoke alarm, water alarm, or other audible alarm that is sounding in an environment, (2) recognizing a glass break event, such as a window break, a door break, or other material break, (3) recognizing a baby crying, (4) recognizing a gun shot or type of gun shot, and (5) recognizing a dog bark or other animal noise. Each of the different use cases can use its own respective training data and can include or use different threshold conditions for analysis.

Various aspects of the present discussion can be implemented in the form of a computer programmable product for performing audio and/or video data receipt and analysis. The computer programmable product can include a set of instructions that, when executed by a processor, causes the processor to perform the various methods and techniques as discussed herein.

Figure 6:
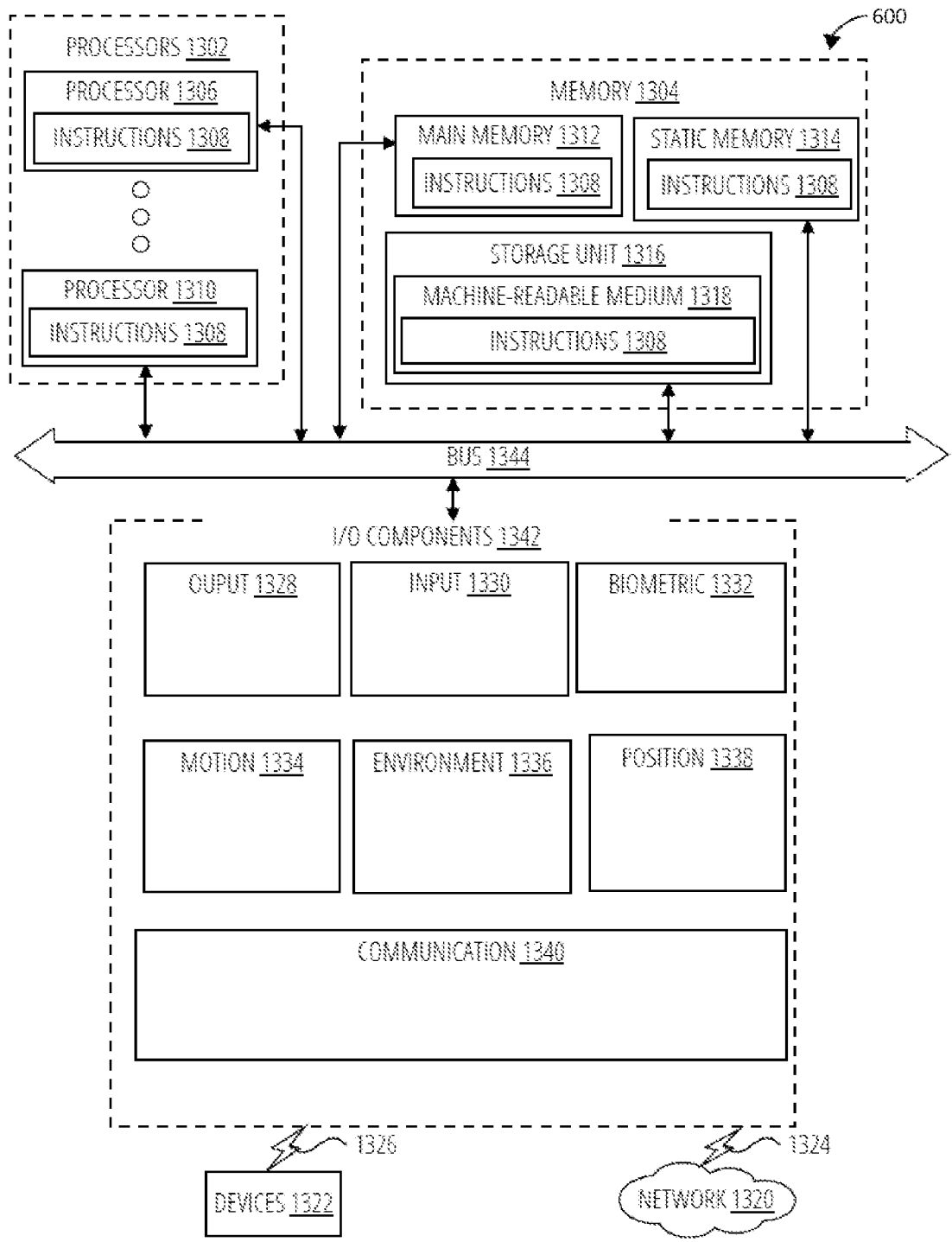
FIG. 6 illustrates generally an example of a machine in the form of a computer system.

FIG. 6 illustrates generally an example of a machine 600 in the form of a computer system within which instructions 1308 can be executed to cause the machine to perform any one or more of the methods discussed herein. In an example, the machine 600 comprises a portion of the system 100, or one or more portions of the system 100 comprise an instance of the machine 600. The instructions 1308 can include software, a program, an application, an applet, an app, or other executable code that causes or configures the machine 600 to perform any one or more of the methods discussed herein, or portions of such methods. For example, the instructions 1308 can cause the machine 600 to execute any one or more of the methods described herein. The instructions 1308 transform a general, non-programmed machine into a particular machine configured or programmed to carry out the described and illustrated functions.

The machine 600 can operate as a standalone device or can be coupled (e.g., networked) to other machines. In a networked deployment, the machine 600 can operate in the capacity of a server machine or a client machine in a server-client network environment, or as a peer machine in a peer-to-peer (or distributed) network environment. The machine 600 can comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1308, sequentially or otherwise, that specify actions to be taken by the machine 600. Further, while only a single machine 600 is illustrated, the term "machine" shall also be taken to include a collection of machines that individually or jointly execute the instructions 1308 to perform any one or more of the methodologies discussed herein.

The machine 600 can include processors 1302, memory 1304, and 110 components 1342, which can be configured to communicate with each other via a bus 1344. In an example, the processors 1302 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) can include, for example, a processor 1306 and a processor 1310 that execute the instructions 1308. The term "processor" is intended to include multi-core processors that can comprise two or more independent processors (sometimes referred to as "cores") that can execute instructions contemporaneously. Although FIG. 6 shows multiple processors 1302, the machine 600 can include a single processor with a single core, a single processor with multiple cores (e.g., a multi-core processor), multiple processors with a single core, multiple processors with multiples cores, or any combination thereof.

The memory 1304 includes a main memory 1312, a static memory 1314, and a storage unit 1316, both accessible to the processors 1302 via the bus 1344. The main memory 1304, the static memory 1314, and storage unit 1316 store the instructions 1308 embodying any one or more of the methodologies or functions described herein. The instructions 1308 can also reside, completely or partially, within the main memory 1312, within the static memory 1314, within machine-readable medium 1318 within the storage unit 1316, within at least one of the processors 1302. (e.g., within the processor's cache memory), or any suitable combination thereof, during execution thereof by the machine 600.

The I/O components 1342 can include a wide variety of components to receive input, provide output, produce output, transmit information, exchange information, capture measurements, and so on. The specific I/O components 1342 that are included in a particular machine will depend on the type of machine. For example, portable machines such as mobile phones can include a touch input device or other such input mechanisms, while a headless server machine will likely not include such a touch input device. It will be appreciated that the I/O components 1342 can include many other components that are not shown in FIG. 12. In various example examples, the I/O components 1342 can include output components 1328 and input components 1330. In an example, the I/O components 1342 include the audio sensor 105. The output components 1328 can include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1330 can include one or more cameras, alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further examples, the I/O components 1342 can include biometric components 1332, motion components 1334, environmental components 1336, or position components 1338, among a wide array of other components. For example, the biometric components 1332 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1334 include acceleration sensor components (e.g., accelerometer), gravitation sensor components, rotation sensor components (e.g., gyroscope), and so forth.

The environmental components 1336 can include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that can provide indications, measurements, or signals corresponding to a surrounding physical environment. The position components 1338 can include location sensor components (e.g., a GPS receiver component), altitude sensor components (e.g., altimeters or barometers that detect air pressure from which altitude can be derived), orientation sensor components (e.g., magnetometers), and the like.

Communication can be implemented using a wide variety of technologies. The I/O components 1342 further include communication components 1340 operable to couple the machine 600 to a network 1320 or devices 1322 via a coupling 1324 and a coupling 1326, respectively. For example, the communication components 1340 can include a network interface component or another suitable device to interface with the network 1320. In further examples, the communication components 1340 can include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1322 can be another machine or any of a wide variety of peripheral devices (e.g., a peripheral device coupled via a USB).

Moreover, the communication components 1340 can detect identifiers or include components operable to detect identifiers. For example, the communication components 1340 can include Radio Frequency Identification (MD) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode PDF417, Ultra Code, UCC RSS-2D bar code, and other optical codes), or acoustic detection components (e.g., microphones to identify tagged audio signals). In addition, a variety of information can be derived via the communication components 1340, such as location via Internet Protocol (IP) geolocation, location via Wi-Fi® signal triangulation, location via detecting an NFC beacon signal that can indicate a particular location, and so forth.

The various memories (e.g., memory 1304, main memory 1312, static memory 1314, and/or memory of the processors 1302) and/or storage unit 1316 can store one or more sets of instructions and data structures (e.g., software) embodying or used by any one or more of the methodologies or functions described herein. These instructions (e.g., the instructions 1308), when executed by processors 1302, cause various operations to implement the disclosed examples.

The instructions 1308 can be transmitted or received over the network 1320, using a transmission medium, via a network interface device (e.g., a network interface component included in the communication components 1340) and using any one of a number of well-known transfer protocols (e.g., hypertext transfer protocol (HTTP)). Similarly, the instructions 1308 can be transmitted or received using a transmission medium via the coupling 1326 (e.g., a peer-to-peer coupling) to the devices 1322.

Various Notes

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code can form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAM), read only memories (ROMs), and the like. The above description is intended to be illustrative, and not restrictive. For example, the above-described examples (or one or more aspects thereof) can be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A system for event detection and classification, the system comprising:
   a processor circuit; and
   a processor-readable media comprising instructions that, when performed by the processor circuit, configure the processor circuit to:
   receive audio information about an audio event;
   apply a first audio event classification algorithm to determine whether the audio information includes an indication of a particular event, wherein the first audio event classification algorithm includes at least one of a support vector machine model, a logistic regression model, or a decision tree model, without utilizing a convolutional neural network;
   identify a multi-dimensional spectrogram using the audio information; and
   in response to determining, by the first audio event classification algorithm, that the audio information includes the indication of the particular event, apply information about the spectrogram at an input to a different second audio event classification algorithm that includes a convolutional neural network-based deep learning algorithm, wherein the different second audio event classification algorithm uses reference data trained target samples mixed with background noise, and wherein an output from the different second audio event classification algorithm includes an identification of the audio event as the particular event.

2. The system of claim 1, wherein the instructions to configure the processor circuit to apply the first audio event classification algorithm include instructions to classify the audio event as corresponding to a particular event type; and
wherein the instructions to configure the processor circuit to apply information about the spectrogram at the input to the different second audio event classification algorithm include instructions to configure the processor circuit to:
identify the audio event as a particular event within the classification of the particular event type.

3. The system of claim 2, wherein the instructions to identify the audio event as a particular event within the classification of the particular event type include instructions to identify the audio event as indicating one or more of a glass break event, a gun shot event, a dog bark event, a security alarm event, a fire alarm event, a smoke alarm event, a water alarm event, or a human voice, shout, or cry event.

4. The system of claim 2, wherein the target samples comprise hard negative target samples mixed with background noise and positive target samples mixed with background noise.

5. The system of claim 4, wherein the hard negative target samples comprise training data that is based on false alarms.

6. The system of claim 1, further comprising a microphone configured to receive acoustic information from an environment and provide the audio information to the processor circuit.

7. The system of claim 6, wherein the processor circuit, the microphone, and the processor-readable media comprise a portion of a security system, a smart speaker or camera device.

8. The system of claim 7, further comprising one or more environment sensors coupled to the security system, and wherein the processor circuit is configured to provide the identification of the audio event as the particular event based in part on information from the one or more environment sensors.

9. The system of claim 8, wherein the one or more environment sensors comprise at least one of a window sensor, door sensor, lock sensor, motion sensor, image sensor, acceleration sensor, position sensor, temperature sensor, humidity sensor, pressure sensor, proximity sensor, or gas sensor.

10. The system of claim 1, wherein the first audio event classification algorithm uses reference data trained on hard negative target samples.

11. A security system for event detection and classification, the security system comprising:
a processor circuit configured to:
receive an audio signal from a microphone, the microphone configured to monitor acoustic information in an environment protected by the security system, and the audio signal comprising acoustic information about an audio event;
apply a first audio event classification algorithm to determine whether the audio signal includes an indication of a particular event, wherein the first audio event classification algorithm is trained on hard negative samples and the first audio event classification algorithm includes at least one of a support vector machine model, a logistic regression model, or a decision tree model, without utilizing a convolutional neural network;
identify a multi-dimensional spectrogram using the audio signal; and
apply information about the spectrogram at an input to a different second audio event classification algorithm that includes a convolutional neural network-based classification algorithm that uses reference samples mixed with background noise to identify whether the information about the spectrogram corresponds to the particular event.

12. The security system of claim 11, further comprising one or more environment sensors coupled to the processor circuit, and wherein the processor circuit is configured to identify the audio event as the particular event using the information from the one or more environment sensors and using information from the first and/or second audio event classification algorithm.

13. The security system of claim 11, further comprising a memory circuit that includes a reference data set for the first and different second audio event classification algorithms, wherein the reference data set includes positive target samples and hard negatives, wherein the hard negatives comprise training data that is based on false alarms.

14. A method for using artificial intelligence-based processing to classify audio information, the method comprising:
receiving audio information about an audio event from a microphone;
using a first audio event classification algorithm, determining a likelihood that the audio information indicates a particular event, wherein the first audio event classification algorithm is trained on hard negative samples and the first audio event classification algorithm includes at least one of a support vector machine model, a logistic regression model, or a decision tree model, without utilizing a convolutional neural network;
responsive to the first audio event classification algorithm determining the audio information is likely to include the particular event, identifying a multi-dimensional spectrogram using the audio information and providing the spectrogram at an input to a different second audio event classification algorithm, wherein the different second audio event classification algorithm includes a convolutional neural network-based classification algorithm that is trained on target samples mixed with background noise; and
providing, at an output from the different second audio event classification algorithm, information about whether the audio information includes the particular event.

15. The method of claim 14, further comprising training the first audio event classification algorithm using hard negatives by selecting, as training data, results for which the algorithm provides a false alarm.

* * * * *

UNITED STATES PATENT AND TRADEMARK OFFICE
CERTIFICATE OF CORRECTION

PATENT NO. : 12,142,261 B2
APPLICATION NO. : 17/203269
DATED : November 12, 2024
INVENTOR(S) : Krishna Khadloya et al.

Page 1 of 1

It is certified that error appears in the above-identified patent and that said Letters Patent is hereby corrected as shown below:

On the Title Page

Item (71), update the Applicant as follows:
Nice North America LLC, Carlsbad, CA (US)

Signed and Sealed this
Twenty-fourth Day of December, 2024

Derrick Brent
*Acting Director of the United States Patent and Trademark Office*